United States Patent [19]

Lewis et al.

[11] Patent Number: 5,071,146

[45] Date of Patent: Dec. 10, 1991

[54] CONVERTIBLE INFANT STROLLER

[76] Inventors: Joe Lewis; Audrey Lewis, both of 1386 Glencoe Ave., Highland Park, Ill. 60035

[21] Appl. No.: 537,587

[22] Filed: Jun. 14, 1990

[51] Int. Cl.$^5$ ............................. B62B 7/12; B62J 1/16
[52] U.S. Cl. .................... 280/30; 224/30 R; 280/202; 280/643; 280/42
[58] Field of Search ................. 280/30, 202, 204, 643, 280/644, 648, 42, 650; 224/31, 30 R

[56] References Cited

U.S. PATENT DOCUMENTS

| | | | |
|---|---|---|---|
| 2,990,190 | 6/1961 | Eriksen | 280/30 |
| 3,390,893 | 7/1968 | MacLaren | 280/644 |
| 3,485,507 | 12/1969 | Christof | 280/202 |
| 3,747,955 | 7/1973 | MacAlpine | 280/204 |
| 3,829,113 | 8/1974 | Epelbaum | 280/30 |
| 3,984,115 | 10/1976 | Miller | 280/30 |
| 4,051,985 | 10/1977 | Berger | 224/32 |
| 4,085,968 | 4/1978 | Svensson et al. | 224/30 R |
| 4,679,804 | 7/1987 | Johnson | 280/30 |

FOREIGN PATENT DOCUMENTS

| | | | |
|---|---|---|---|
| 512787 | 7/1952 | Belgium | 280/30 |
| 2334284 | 7/1974 | Fed. Rep. of Germany | 280/642 |
| 8001065 | 9/1981 | Netherlands | 280/30 |
| 8400250 | 8/1985 | Netherlands | 280/202 |

Primary Examiner—David M. Mitchell
Attorney, Agent, or Firm—Laff, Whitesel, Conte & Saret

[57] ABSTRACT

A child or infant stroller is provided which is convertible from an operative stroller position to a folded position adapted to be received by and secured on a conventional bicycle infant carrier. The stroller generally comprises a child or infant seat and a frame member supporting the infant seat. The frame member includes two pair of legs, one of which, preferably a front pair, is adapted to rotate and releasably engage with an upper portion of the frame member. The stroller can then be placed on the bicycle infant carrier and be secured by a belt included with the conventional bicycle infant carrier. A removable attachment may also be included which attaches the two pairs of legs together when the stroller is in its operative stroller position.

18 Claims, 3 Drawing Sheets

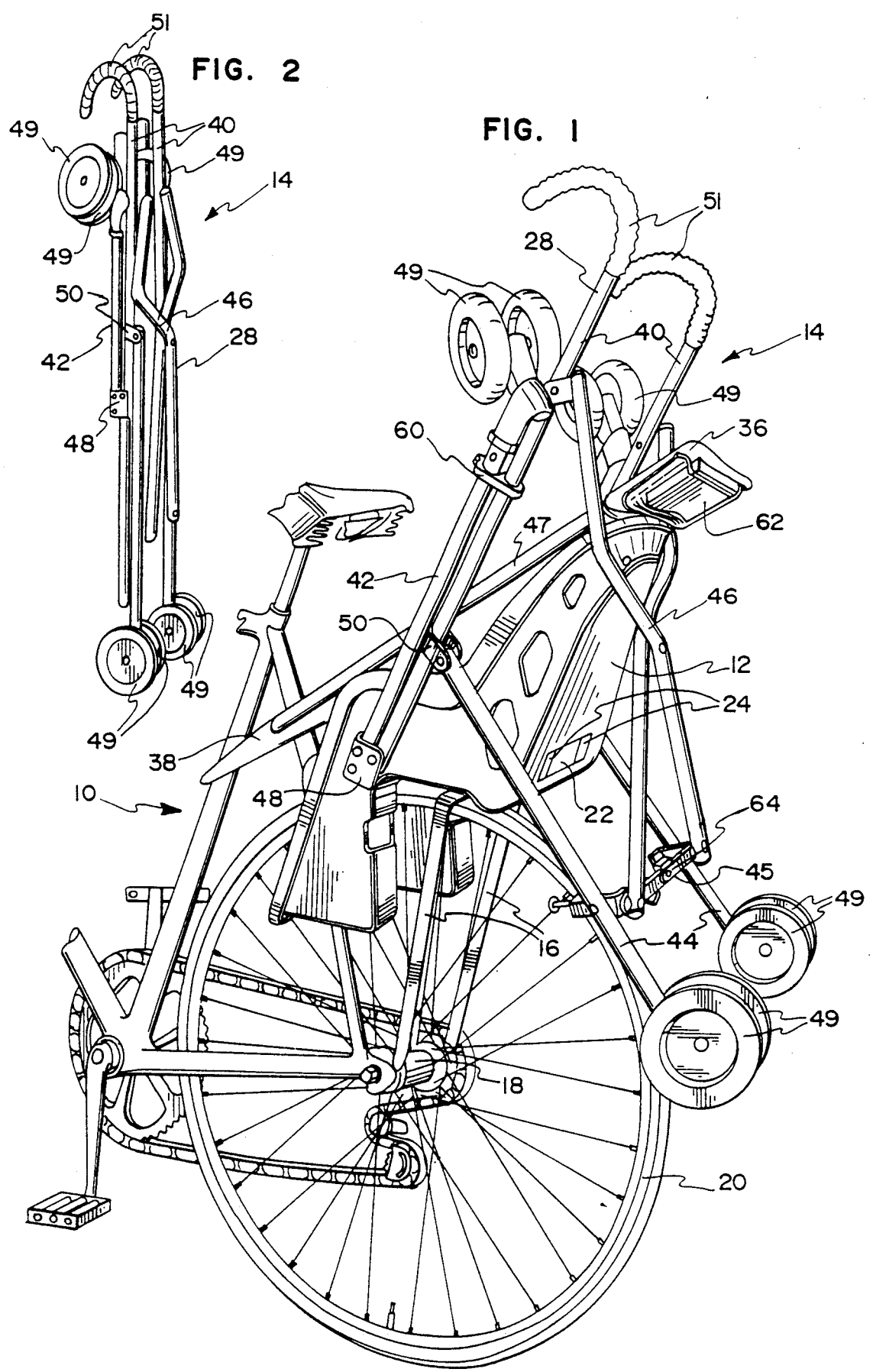

CONVERTIBLE INFANT STROLLER

FIELD OF THE INVENTION

The present invention relates to an infant stroller adapted to be carried on a bicycle infant carrier.

BACKGROUND OF THE INVENTION

Collapsible child or infant strollers are heretofore known which can convert from an operative stroller position to a folded position to provide ease of storage. Generally, the stroller is comprised of an infant seat and a frame having a pair of arms, a front pair of legs, a rear pair of legs pivotally mounted to the center of the frame, and a wheel mounted to each leg so that the stroller may be pushed along a surface. The frame surrounds the infant seat, which is constructed generally of a canvas or soft cloth. A collapsible x-frame and a pivotable bar at the base of the x-frame allow the stroller to convert from the stroller position to the folded position. More specifically, in the stroller position, the x-frame prevents the rear pair of legs from pivoting and keeps the legs and arms spaced. Application of a force to the pivotable bar causes the bar to pivot at its center, the x-frame to collapse, and the rear pair of legs to rotate clockwise and come in contact with the front pair of legs.

Bicycle child or infant carriers are also heretofore known which consist essentially of a hard plastic chair or seat which can be attached to the axle of the rear wheel of a bicycle by a fastening means. The fastening means is generally comprised of two support members extending upward from the axle on each side of the rear wheel to the bottom of the bicycle infant carrier. The conventional bicycle infant carrier also includes a belt which is adapted to secure the infant to the carrier.

One major disadvantage of the conventional infant strollers is that they tend to be bulky, difficult to transport, and, of course, not capable of being carried on a bicycle. This severely limits the use of the infant stroller for persons who wish to bicycle to the location at which they wish to use the stroller in light of the difficulties in transporting both the stroller and the infant.

Accordingly, the present invention overcomes the disadvantages of the conventional infant stroller by providing a stroller adapted to readily convert from an operative stroller position to a folded position which may be carried on a bicycle fitted with a conventional bicycle infant carrier. The infant can then be placed on the infant seat of the stroller and the stroller and infant can be transported by bicycle to a location at which the stroller can be converted back to its operative stroller position.

In accordance with the invention, a convertible frame is provided which surrounds and is attached to the infant stroller seat. As with the prior art stroller, the frame includes two pairs of legs which provide a stand for the stroller when the stroller is in the operative position. One of the pairs of legs is adapted to fold so that the stroller can be received, secured, and transported on a conventional bicycle carrier.

In accordance with the invention, a removable attachment means may be included which connects the front and rear pair of legs when the stroller is in the operative stroller position. To convert the stroller to its folded position, the removable attachment means is removed to allow two of the legs, preferably the front legs, to fold upward. To keep the legs in the folded position, an engaging means on the frame member releasably engages the legs to the arms of the frame member. The belt used with the conventional bicycle infant carrier can be used to attach and restrain the stroller and the child on the bicycle infant carrier.

Other objects and features of the present invention will become apparent from the following detailed description considered in connection with the accompanying drawings which disclose the embodiments of the invention.

BRIEF DESCRIPTION OF THE DRAWINGS

FIG. 1 is a side perspective view of the stroller in its folded position resting on the bicycle infant carrier, including a partial view of the bicycle.

FIG. 2 is a side perspective view of the stroller of FIG. 1 in its folded position and separated from the bicycle infant carrier.

DETAILED DESCRIPTION OF THE DRAWINGS

Figures 5, 6:
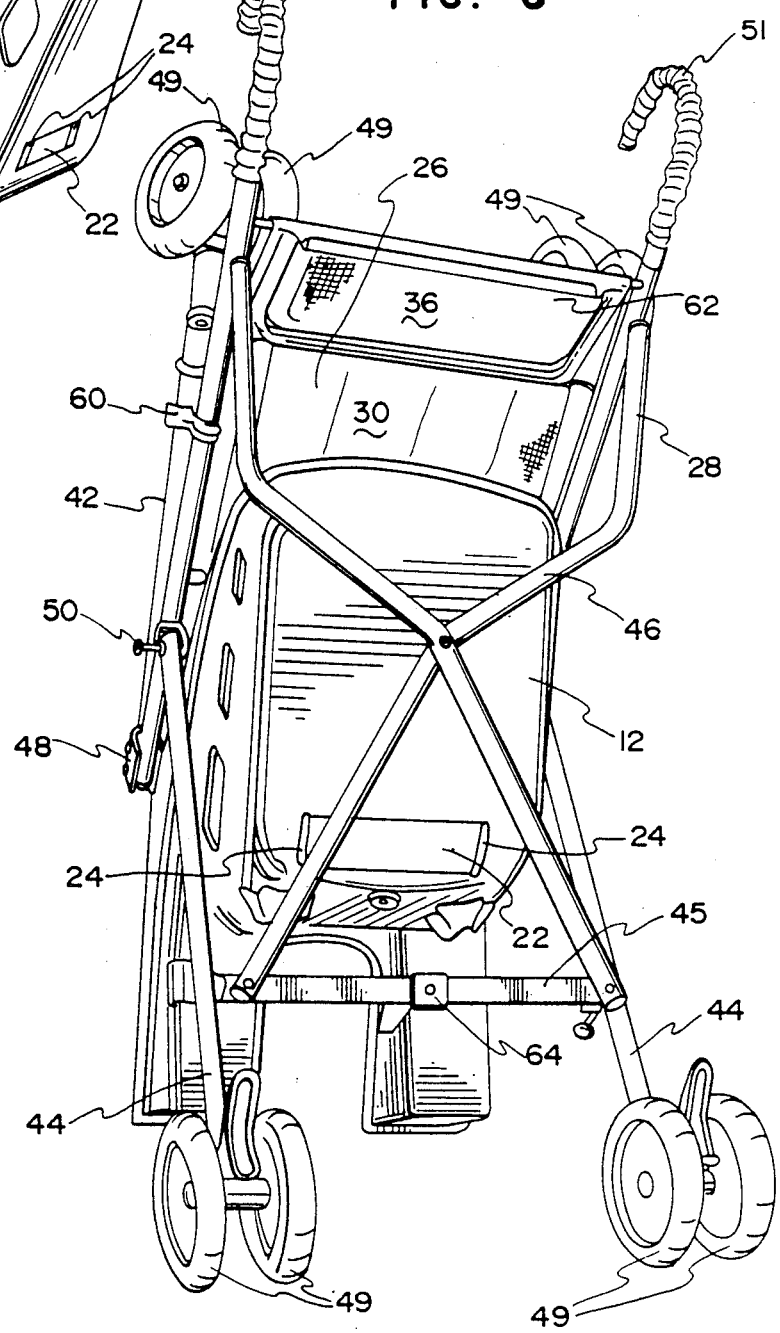
FIG. 5 is a side perspective view of the conventional bicycle infant carrier.
FIG. 6 is a rear perspective view of the infant stroller of FIG. 1 in the folded position resting on the bicycle infant carrier.

FIG. 1 shows a partial view of an ordinary bicycle 10, a conventional bicycle infant carrier 12, and a convertible child or infant stroller 14 in accordance with the invention. As shown, the conventional bicycle infant carrier is attached to the rear end of the bicycle by the use of two supports 16, which are attached on one end to axle 18 of a rear bicycle wheel 20 and, on the other end, to a bottom of the bicycle infant carrier. As shown in FIG. 5, the conventional bicycle infant carrier 12 may also include a belt 22 which extends through slots 24 of the infant carrier 12 and which is normally used to secure a child or infant in the carrier.

Figure 3:
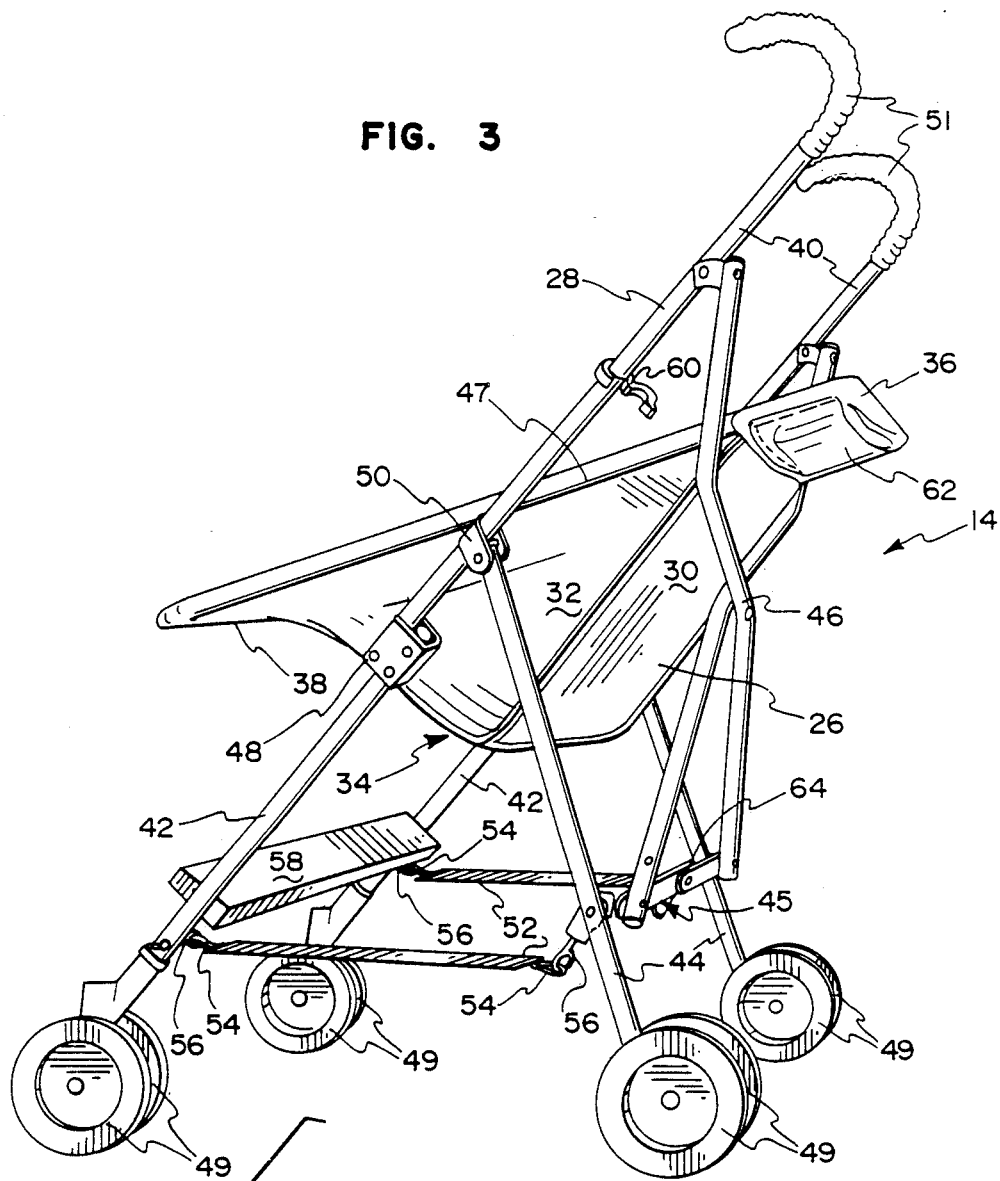
FIG. 3 is a side perspective view of the stroller of FIG. 1 shown in the operative stroller position.

Referring to FIG. 3, there is shown the convertible infant stroller 14 comprising an infant seat 26 and a supporting means or frame member 28. Preferably, the infant seat 26 is a conventional stroller seat constructed of a canvas or nylon material and comprised of a rear panel 30, two side panels 32, and a seat panel 34. A top panel 36 and a bottom panel 38 may also be included.

Frame member 28 comprises two arms 40, a pair of front legs 42, a pair of rear legs 44, an X-frame 46 connecting the arms 40 to the rear pair of legs 44, and a collapsible bar 45 connecting the two legs 44. The frame member may further include a pair of bars 47 which are attached to bottom panel 36 and top panel 38 of infant seat 26. Each leg 42, 44 is attached to a wheel 49 to allow the stroller to be pushed along a surface. Two of the legs, preferably the front legs 42, are connected to the arms 26 by articulated joints 48. The articulated joints 48 allow front legs 42 to rotate relative to the arms 40 when a horizontal force is applied to the legs 42. The other two legs, preferably the rear legs 44, are each attached to arms 26 by a fixed joint 50. A collapsible bar 45, which includes a joint 64, keeps joint 50 rigid and keeps x-frame 46 in a locked position when the stroller is in its operative stroller position. A curved handle or grip 51 is included at a top end of each arm 40.

Figure 4:
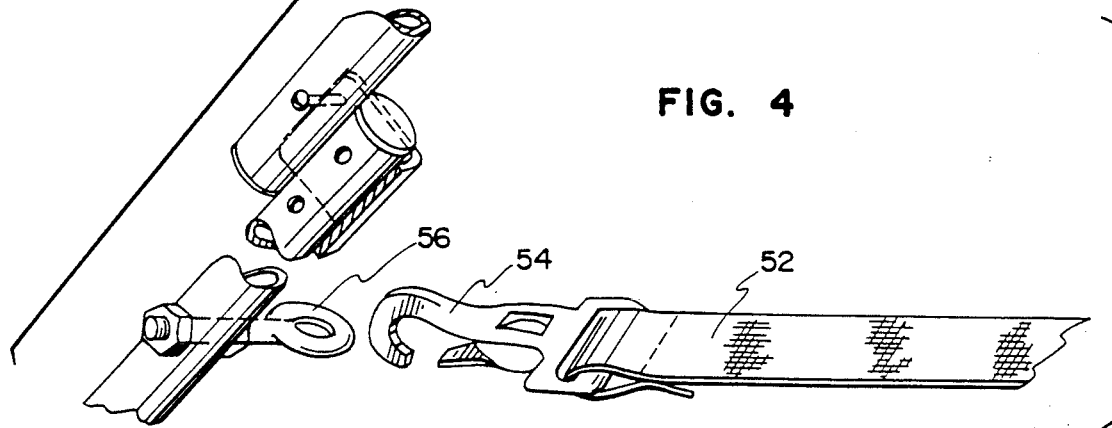
FIG. 4 is a partial perspective view of the means for attaching the two pairs of legs and a perspective view of an articulated joint which attaches one of the foldable legs to one of the arms of the frame member.

When the stroller is in its operative stroller position as shown in FIG. 3, a removable attachment means may be included to attach the front and rear pairs of legs to prevent the front pair of legs from rotating. Any removable attachment means can be used such as, for instance, a removable bar or strap 52. Referring to FIG. 4, the attachment means may further include a clasp 54 located on both ends of the strap 52 which removably attaches to fasteners 56 located on the legs. In the operative stroller position, a spacer 58 may also be attached to each front leg 28 to keep the front legs spaced.

The stroller may be converted from its operative stroller position shown in FIG. 3 to the folded position shown in FIG. 1 as follows. Straps 52 and spacer 58 are completely detached and separated from the legs 42, 44. A horizontal force is applied to each of the front legs 42 causing the legs 42 to rotate upward at the articulated joints 48 and releasably engage with a flexible clasp 60 located on each arm 40. The stroller is then lifted and placed on the conventional bicycle carrier 12.

The child or infant may then be placed on the infant seat and belt 22 is wrapped around the infant and around the infant seat 12, as shown in FIG. 1, to keep the stroller and infant secured on the bicycle infant carrier. In addition, a pocket 62 may be included on a backside of the top panel 36 to retain the removable straps 52 and the spacer 58 while the stroller is in its folded position.

The stroller may also be convertible to a third position as shown in FIG. 2 which allows ease of storage. It is converted to this position by extending an upward force on joint 64 of bar 45, causing the bar to pivot at the joint, the x-frame 46 to pivot at a center 66, and the rear pair of legs to pivot in a clockwise direction.

A convertible infant stroller is therefore provided which is convertible from an operative stroller position to a folded position adapted to be received by and secured on a conventional bicycle infant carrier. It is thus appreciated that a person may easily and readily transport by bicycle the infant stroller and infant to a location at which the stroller may be easily and readily converted to its operative stroller position.

Other embodiments of the principles of this invention are contemplated, and the appended claims are intended to cover such other embodiments as are within the spirit and scope of this invention.

We claim:

1. In combination with a bicycle infant carrier to be fitted on a bicycle, the bicycle infant carrier comprising a base, a back rest, and two sides, a convertible stroller adapted to be carried on the bicycle infant carrier, the convertible stroller comprised of:
   (a) means for seating a child; and
   (b) means for supporting said seating means, the supporting means being movable between a stroller position for operation independently of the bicycle and a folded carrier position for carriage on the bicycle infant carrier, the supporting means comprised of:
      (1) two spaced arms, each arm located adjacent a corresponding one of the sides of the infant carrier when the supporting means is in the folded carrier position on the bicycle infant carrier;
      (2) a plurality of articulated joints attached to the arms;
      (3) a plurality of first leg members attached to the articulated joints; and
      (4) plurality of second leg members attached to each arm, the first and second leg members adapted to support the stroller in an upstanding position when the supporting means is in the stroller position;

whereby said seating means is adapted to be received by said bicycle infant carrier and supported by the base of said bicycle infant carrier when the supporting means is in the folded carrier position on the bicycle infant carrier.

2. The stroller of claim 1 wherein the first leg members are adapted to rotate at the articulated joints.

3. The stroller of claim 1 wherein the supporting means further comprises removable means for connecting the first pair of leg members to the second pair of leg members when the supporting means is in the stroller position.

4. The stroller of claim 1 wherein the supporting means is further comprised of a means for releasably engaging the first leg members to the arms when the supporting means is in its folded carrier position.

5. The stroller of claim 4 wherein the releasably engaging means is comprised of a flexible clasp.

6. The stroller of claim 1 wherein the supporting means is further comprised of a removable spacer connecting together each first leg member when the supporting means is in the stroller position.

7. The stroller of claim 1 wherein the upper end of each arm is curved to form a handle.

8. The invention of claim 1 wherein the seating means is comprised of a back panel, a bottom panel and two side panels and has an outwardly facing opening.

9. The stroller of claim 1 wherein the supporting means is constructed of metal and wherein the seating means is constructed of vinyl.

10. The stroller of claim 1 wherein the bicycle infant carrier is further comprised of a belt adapted to wrap around and restrain the seating means when the supporting means is in its folded carrier position.

11. The stroller of claim 1 wherein the stroller is further movable to a folded storage position.

12. A convertible stroller adapted to be carried on a bicycle fitted with a bicycle infant carrier, the stroller comprised of:
   (a) means for seating a child, the seating means having a back side and first and second pockets on the back side; and
   (b) means for supporting said seating means, the supporting means being movable between a stroller position for operation independently of the bicycle and a folded carrier position for carriage on the bicycle infant carrier, the supporting means comprised of:
      (1) two spaced arms;
      (2) a plurality of articulated joints attached to the arms;
      (3) a plurality of first leg members attached to the articulated joints and a plurality of second leg members attached to each arm, the first and second leg members adapted to support the stroller in an upstanding position when the supporting means is in the stroller position; and
      (4) a pair of laterally-spaced support members which are attached to the seating means and the arms, each support member having a first end and a second end, the first pocket on the seating means adapted to receive the first end of each support member, and the second pocket on the seating means adapted to receive the second end of each support member.

13. The stroller of claim 12 wherein the supporting means is further comprised of an X-brace extending from the upper end of the arm to a lower end of the second pair of leg members.

14. A convertible stroller adapted to be carried on a bicycle fitted with a bicycle infant carrier, the stroller comprised of:
   (a) means for seating a child; and
   (b) means for supporting said seating means, the supporting means being movable between a stroller position for operation independently of the bicycle and a folded carrier position for carriage on the bicycle infant carrier, the supporting means comprised of:
      (1) two spaced arms;
      (2) a plurality of articulated joints attached to the arms;
      (3) a plurality of first leg members attached to the articulated joints and a plurality of second leg members attached to each arm, the first and second leg members adapted to support the stroller in an upstanding position when the supporting means is in the stroller position; and
      (4) removable means for connecting the first pair of leg members to the second pair of leg members when the supporting means is in the stroller position;
   the connecting means comprised of a plurality of straps, a plurality of clasps, and a plurality of means for engaging the clasps, one clasp being located at each end of the strap and one engaging means located on each first and each second leg member.

15. A convertible stroller adapted to be carried on a bicycle fitted with a bicycle infant carrier, the stroller comprised of:
   (a) means for seating a child; and
   (b) means for supporting said seating means, the supporting means being movable between a stroller position for operation independently of the bicycle and a folded carrier position for carriage on the bicycle infant carrier, the supporting means comprised of:
      (1) two spaced arms;
      (2) a plurality of articulated joints attached to the arms;
      (3) a plurality of first leg members attached to the articulated joints and a plurality of second leg members attached to each arm, the first and second leg members adapted to support the stroller in an upstanding position when the supporting means is in the stroller position;
      (4) removable means for connecting the first pair of leg members to the second pair of leg members when the supporting means is in the stroller position;
      (5) a removable spacer connecting together each first leg member when the supporting means is in the stroller position; and
      (6) a means for retaining the removable straps and removable spacer when the supporting means is in the folded carrier position.

16. The stroller of claim 15 wherein the retaining means is comprised of a pocket located on the backside of the seating means.

17. A convertible stroller adapted to be carried on a bicycle fitted with a bicycle infant carrier, the stroller comprised of:
   (a) means for seating a child; and
   (b) means for supporting said seating means, the supporting means being movable between a stroller position for operation independently of the bicycle, a folded carrier position for carriage on the bicycle infant carrier, and a folded storage position, the supporting means comprised of:
      (1) two arms;
      (2) a plurality of articulated joints attached to the arms;
      (3) two first legs attached to the articulated joints;
      (4) two second legs, pivotally mounted to the arms;
      (5) a collapsible x-frame connecting the second legs to the arms, the x-frame adapted to keep the arms separated and the two second legs separated when the supporting means is in the stroller position; and
   a bar connecting the two second legs adapted to prevent the second legs from pivoting and the x-frame from collapsing when the supporting means is in the stroller position, the bar also adapted to pivot at its center;
   whereby application of a force to the bar causes the supporting means to convert to the folded storage position by causing the bar to pivot at its center, the x-frame to collapse, and the second legs to rotate toward the first legs.

18. A kit comprising:
   a bicycle infant carrier;
   a seat;
   a stroller supporting the seat and being movable between a stroller position for operation independently of the bicycle infant carrier and a folded carrier position for carriage on the bicycle infant carrier, the stroller comprising two spaced arms, a plurality of articulated joints attached to the arms, and a pair of first leg members attached to the articulated joints and a pair of second leg members attached to each arm, the first and second pair of legs adapted to support the stroller in an upstanding position when the stroller is in its stroller position;
   a plurality of straps and a plurality of clasps adapted to connect the first pair of leg members to the second pair of leg members when the stroller is in the stroller position;
   a spacer adapted to connect together each first leg when the stroller is in its stroller position; and
   a plurality of articulated joints located on the first pair of leg members adapted to allow the first leg members to rotate at the articulated joints.

* * * * *